United States Patent [19]

Giosuè

[11] Patent Number: 4,914,470
[45] Date of Patent: Apr. 3, 1990

[54] DEVICE TO BE PARTICULARLY FITTED ONTO COLOR PHOTOCOPYING MACHINES FOR OBTAINING REPRODUCTIONS ALSO FROM DIAPOSITIVES

[75] Inventor: Franci Giosuè, Pordenone, Italy

[73] Assignee: Gretag San Marco S.p.A., Pordenone, Italy

[21] Appl. No.: 238,814

[22] Filed: Aug. 31, 1988

[30] Foreign Application Priority Data

Sep. 1, 1987 [IT] Italy .................................. 45742

[51] Int. Cl.$^4$ ............................................. G03B 27/32
[52] U.S. Cl. ........................................... 355/32; 355/67
[58] Field of Search ................... 355/20, 27, 32, 28, 355/21, 43, 45, 60, 65-67, 326, 327

[56] References Cited

U.S. PATENT DOCUMENTS

| | | | |
|---|---|---|---|
| 4,120,580 | 10/1978 | Mailloux et al. | 355/327 |
| 4,742,375 | 5/1988 | Kogane et al. | 355/20 |
| 4,764,792 | 8/1988 | Ducos et al. | 355/27 |

FOREIGN PATENT DOCUMENTS

| | | |
|---|---|---|
| 0064015 | 11/1982 | European Pat. Off. |
| 0124463 | 11/1984 | European Pat. Off. |
| 1013511 | 8/1957 | Fed. Rep. of Germany |
| 8704266 | 7/1987 | World Int. Prop. O. |

Primary Examiner—Michael L. Gellner
Assistant Examiner—Khanh Dang
Attorney, Agent, or Firm—Wenderoth, Lind & Ponack

[57] ABSTRACT

A stereopticon lantern (2) is fitted to one per se known color photocopying machine (1) operating by utilizing a photochemical process, so as the diapositive is projected onto the same reproduction screen (15) thereof, thus obtaining a double possibility of reproduction. The color photocopying machine (1) to which said stereopticon lantern (2) can be fitted comprises a horizontal shooting plane (11) constituted by a thoroughly transparent glass plate onto which the image to be reproduced is put, which image is illuminated below by adequate lamps (12) and the so illuminated image is horizontally reflected by a mirror (13) disposed at a 45° angle inclined beneath said shooting plane and is projected, through a relative optical control unit (14), onto a vertical screen (15) constituted by a photosensitive paper sheet (16), obtained from a band wound about a respective roller (17). After the exposure, the so exposed sheet (16) passes through a developing side (SV) and a subsequent drying side (SE) of conventional kind, disposed in the lower part of the same machine and leaves it by collecting in an adequate container (R). The stereopticon lantern (2) is placed laterally to the shooting plane (11) of the photocopying machine (1) and is connected to an adequate rigid frame (T1), removably fitted to the framework (1C) thereof, so that its projection axis (AV2) results to be parallel to the axis (AV1) of said shooting plane (11) and secant orthogonally the horizontal projection axis (A01). Besides, a movable mirror (31) inclined at a 45° angle, is disposed along the horizontal projection axis (A01) of the photocopying machine (1), after the optical control unit (29) of the stereopticon lantern (2) as well as the optical control unit (14) of the fotocopying machine (1), which movable mirror (31) is able to diverge the image produced by the stereopticon lantern (2) onto the same screen (15) of the photocopying machine (1). Such movable mirror (31) may be controlled for being positioned out of the projection light beam of the photocopying machine, so as to allow the same to operate in a conventional manner. Finally, per se known operating, controlling and regulating means are provided for obtaining a regular operation of the so constituted assembly.

16 Claims, 1 Drawing Sheet

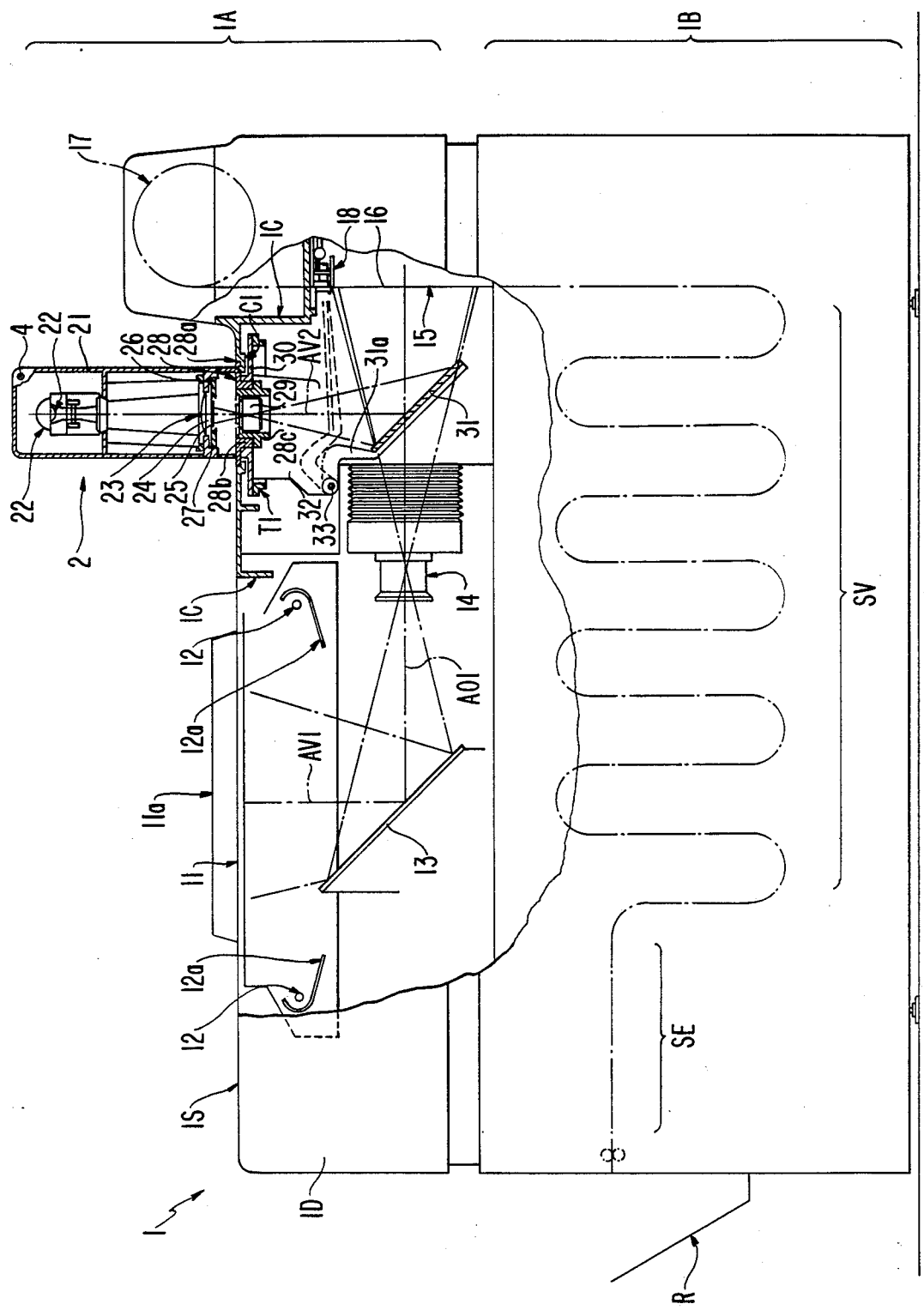

DEVICE TO BE PARTICULARLY FITTED ONTO COLOR PHOTOCOPYING MACHINES FOR OBTAINING REPRODUCTIONS ALSO FROM DIAPOSITIVES

The present invention relates to a device which can be fitted optionally and preferably onto a colour photocopying machine, permitting also reproductions from diapositives to be directly effected by utilizing the same machine.

Particular machines, generally called photocopying machines are known and widely diffused, which permit reproductions of an image transferred onto a suitable support like as paper, card or the like to be obtained therefrom.

A first kind of such machines permits, by utilizing a particular operating principle, reproductions also onto normal paper, at black and white conditions only, to be obtained, wherein such operating principle is more known and generally employed but it is proper for reproducing documents, drawings etc only, while on the contrary it does not allow colour prints from colour images to be obtained.

Another kind of machine, the so-called "colour photocopying machine" has been designed for obtaining colour reproductions, which machine comprises, like the black and white reproducing photocopying machines, a horizontal plane constituted by a completely transparent glass slab, onto which a card, a paper sheet or the like is disposed, whose image to be reproduced is illuminated by suitable lamps which are appropriately arranged within the machine and are projecting the light onto the image. Then, the so illuminated image is projected by means of an appropriate optic control unit onto a screen constituted by a sheet of an adequate colour reproducing photosensitive paper.

Moreover, a 45° inclined mirror is usually placed below the transparent plane, which mirror reflects the image in a horizontal direction, so that also the optic control unit is disposed along the horizontal axis of such image, thus projecting it onto the photosensitive paper which is disposed in a vertical direction thereof. In order to obtain enlargements or reductions thereof, both the mirror and the optic control unit are provided with adequate electronic controlled means, which are proper to position them reciprocally and with respect to both the image to be reproduced and the reproduced image, depending on the required adjustment thereof. The photosensitive paper sheet is obtained from a band wound onto a correspondent roller, located within a relative loading room and is cut from such band by means of an adequate cutter.

When the image has been exposed onto such photosensitive paper sheet, the latter is being passed along a developing part and a subsequent conventional drying part, both disposed at the lower part of the machine.

Finally, such a photosensitive paper sheet leaves the photocopying machine by passing through a specific opening thereof, and stores it into an adequate container.

As it is known, in addition to the direct reproduction of colour images, which are transferred onto sheets or other supports as described, it is often required also the reproduction of colour images transferred onto the well known "diapositives".

On the contrary, the prints obtained from the "diapositives" are usually effected by means of printing and developing processes performed by utilizing specific appliances in photographic labs.

The scope of the present invention is to utilize a conventional colour photocopying machine, which performs already automatically all the photoreproduction steps in the manner specified as above, for obtaining also reproductions from diapositives.

This scope is obtained with the device according to the invention, which is characterized in that an already known stereopticon lantern is fitted onto an already known colour photocopying machine, which stereopticon lantern is arranged in such a manner as to project the image produced therefrom onto the same reproduction screen of such colour photocopying machine.

In order to understand better the features of the invention and the advantages attainable therefrom, the whole will be hereinfter described, in a preferred embodiment thereof and by way of a not limiting example only, with reference to the attached drawing, which shows a schematic partially cut side view of a colour photocopying machine in which the device referred to is fitted.

Therefore, referring now to such drawing, it is to be firstly noted the already known colour photocopying machine 1, operating with a photochemical process, which comprises in its upper part 1A the reproduction part, which is described in detail later on, and in its lower part 1B the developing part SV and the drying part SE, both of conventional kind.

Obviously, the machine comprises an adequate framework 10 onto which proper panels are fitted, which panels form an envelope 1D preventing any light from passing therethrough.

A horizontal shooting plane 11 is disposed onto the upper surface 1S of the photocopying machine and is constituted by a completely transparent glass slab, onto which the paper sheet, the card or the like carrying the colour image to be reproduced is put.

Besides, a suitable cover 11a is disposed over such shooting plane 11 and is positionable thereon for covering such sheet in order to ensure an excellent positioning thereof during the reproduction operation.

Adequate lamps 12, provided with relevant reflectors 12a which illuminate the image to be reproduced in an uniform manner, are disposed within the machine, below said horizontal shooting plane 11 at the lateral sides thereof. Besides, a 45° inclined mirror 13 reflecting horizontally the whole shooting view is disposed along the vertical axis AV1 of such shooting plane 11, adequately spaced therefrom.

In correspondence of the horizontal projection axis A01 so resulting therefrom, it is situated a convenient optic control unit 14, which focalizes the image onto a vertical screen 15 constituted by an adequate photosensitive paper sheet 16 for positive colour reproduction prints. Such photosensitive paper sheet 16 is obtained by a relative band wound onto a roller 17, from which it is progressively cut by a per se known cutter 18.

Then, after that the projection of the image onto the sheet has been effected by means of an exposure suitably controlled by adequate electronic devices, the so exposed sheet is transferred to the developing part SV comprising a series of tanks containing the several chemical baths and water, through which tanks the sheet is being passed in a conventional manner.

Afterwards, the sheet is transferred to the drying part SE included within an adequate envelope in which adequate ventilating and heating means, the latter provided for the drying air are also disposed in an usual manner. Finally, the sheet passes through a specific opening provided at the outlet side of the photocopying machine for leaving thereof, and collects into a suitable container R.

The roller 17 for supplying the photosensitive paper as well as the advancement path thereof within both the developing part SV and the drying part SE of the machine are indicated only schematically by a dashed line in the drawing.

It is to point out specifically that both the mirror 13 and the optical control unit 14 are provided with devices for regulating their reciprocal positioning and with respect to the image to be reproduced and to reproduced image, thus allowing enlargements or reductions thereof to be obtained.

Moreover, adequate coloured filters (not shown in the drawing) for the chromatic correction of the image, are provided in the optical control unit, which filters are also driven by relative control devices thereof.

The operation and the control of the several machine actuating devices, such those provided for regulating the positioning of the mirror 13 and the optical control unit 14, with consequent adjustment of the reproduction ratio, those provided for regulating the image exposure times as well as the devices for controlling and regulating the chromatic correction filters and those provided for controlling the sequence of the different printing, developing, drying steps etc., are all of electronic kind.

Hitherto, the present colour photocopying machine in the original embodiment thereof provided only for the usual reproduction of images carried by adequate supports such paper sheets, cards and the like has been synthetically described.

Therefore, the device according to the present invention and the application thereof onto such machine are now described.

Such device, which will be hereinafter described in detail, according to the preferred embodiment thereof to which reference is made, is substantially constituted by two parts: a fixed part formed by a support structure for a movable mirror 31, which structure is connected to a frame T1 in turn connected to the framework 1C of the same machine, so as to predispose it for the application of the diapositive reproduction system thereto, and a removable part constituted by a head 20 of a stereopticon lantern 2, which can be fitted optionally to the main colour photocopying machine 1.

Said fixed part is constituted by a plate 30 connected to a frame T1 which in turn is fitted to the upper portion of the main framework 1C of the photocopying machine 1, at the lateral side of said shooting plane 11.

Such plate 30 is provided centrally with a hole for the introduction, as described later, of the end of the head 20 of the stereopticon lantern 2 therein and is arranged in such a manner that the vertical projection axis AV2 of said stereopticon lantern 2 be parallel to the vertical axis AV1 of the shooting plane 11 and secant orthogonally to the horizontal projection axis A01.

From such plate 30 vertically extend downwardly two additional plates 32, parallel each other and with respect to said horizontal projection axis A01, plates to which a support 31a for a movable mirror 31 is pivoted about an axis 33 which is orthogonal to said horizontal projection axis A01.

Therefore, such movable mirror can be rotated about the axis 33 and, as clearly it appears from the drawing, positioned in two positions, a first position indicated by a continuous line in which such movable mirror 31 is arranged in correspondence of the projected beam of light originated by the optical control unit 14 of the photocopying machine, at the intersection point of the horizontal projection axis A01 of the machine with the vertical projection axis AV2 of said stereopticon lantern 2, as well as it can be adequately inclined at 45° angle with respect to such axis so as to reflect the image, produced as hereinafter described by said stereopticon lantern 2, onto the same screen 15 of the same photocopying machine 1, and a second position indicated by a dashed line in which such mirror 31 is disposed outside the beam of light originated by said optical control unit 14, without intercepting thereof.

In correspondence of such plate 30 the framework 1C of the photocopying machine 1 is provided with a frame C1, which is adequately shaped for mounting, as described later, the flange 28a of the head 20 of the stereopticon lantern 2 therein.

Besides, the envelope 1D in turn is obviously provided with a correspondent opening at the level of such frame C1, which opening permits either such head 20 or a suitable closing cover which is used when said head 20 is not utilized, to be fitted thereto in order to prevent undesired light from passing therethrough and so forming always a continuous upper plane of the machine.

The movable mirror 31 is operated in the two positions described as above, by means of adequate driving means such as for instance an appropriate electric geared motor, cooperating with adequate positioning and control means etc. all of per se known kind, which means aren't indicated in the drawing for simplicity reasons, and for the same reason also the coloured correction filter unit of per se known kind isn't indicated, which unit in turn is fitted preferably to said plate 30 and is operated by means of per se known driving, selection and control means.

Now, let's describe synthetically the respective removable part of the device referred to, after the fixed part thereof.

As clearly pointed out from the drawing, such removable part is substantially constituted simply by a head 20 of a stereopticon lantern 2, which is suitably shaped for permitting the same to be fitted to such fixed part and therefore to the main photocpying machine. Such head 20 is constituted by a substantially parallepiped envelope 21, into which the different projection elements, all per se known, are disposed, namely a suitable lamp 22 with relevant reflector 22a is disposed in the upper part of such envelope 21, in a manner that the luminous beam thereof is turned toward a suitable plane-convex lens 23, situated adequately spaced near the lower part of the same envelope, with its convex part turned toward said lamp 21, whose function as known is that to generate a light beam able to illuminate evenly the diapositive 24 placed at the lower side of such plane-convex lens 23, near its plane part.

As it is known, such diapositive 24 is constituted by a thin film sheet onto which the colour image to be projected is reproduced as positive print, and which is usually mounted onto a suitable frame 25, which can be fitted onto an adequate loading slide 26.

The plane-convex lens 23 is connected to the upper par of a first diaphragm 27 disposed in the lower part of the head 20, in whose lower part a guide is also provided, in which said loading slide 26 can slide in such a manner that the same can be shifted manually outwardly, for permitting the diapositive holder frame 25 to be loaded thereto, and thereafter brought back to the projection position illustrated by the drawing.

A second additional diaphragm 28, projected from the perimeter of the body of the envelope 21 with a flange 28a, is provided below said first diaphragm 27 and is shaped with an inner sleeve 28b, permitting a coupling 28c onto which the optical control unit 29 is fitted, to be connected thereto.

Such sleeve 28b, is additionally provided with an outer diameter which is complementary to the hole provided centrally to the plate 30 of said fixed part, so that such head 20 of said removable part is thoroughly guided and positioned when it is fitted to such fixed part.

The flange 28a is so shaped as that a suitable "light trap" can be formed therfrom, and is provided with adequate positioning and connecting means permitting said head 20 to be fitted thereto and removed optionally therefrom, a certain, simple and rapid way.

For simplicity reasons, such connecting means aren't illustrated by the drawing, since they can be formed by various systems utilizing various per se known devices. Besides said head 20 is provided, according to the preferred embodiment thereof to which reference is made, with a control push buttom 4 disposed in its upper part for controlling the positioning of such movable mirror 31, as well as with adequate connecting elements for obtaining the required electrical supply of such push buttom 4 and lamp 22 to the photopying machine 1.

Always considering this embodiment, the optical control unit 29 is interchangeable for permitting reproductions from diapositives of the usually utilized sizes to be obtained.

However, it is well understood that also a suitably controlled optical system can be provided for obtaining any modification of the sizes of the reproduction.

Evidently, the photocopying machine modified in the manner as described allows a double use thereof, which is as much as ever profitable.

Synthetically, the operation of the machine is the following.

When reproductions from diapositives aren't needed, the head 20 can be removed from the photocopying machine and in such case the movable mirror 31 positions itself automatically out of the conventional projection light beam. In addition, the opening provided on the upper plane of the photocopying machine is closed by an adequate cover (not shown), which besides preventing any light from passing therethrough, makes such upper plane continuous in a very useful manner.

On the contrary, by removing such cover from the photocopying machine 1 and applying to the latter said removable part which, as described, is constituted by the head 20 of the stereopticon lanter 2, the photocopying machine is qualified for operating in conventional manner, by performing colour reproductions from colour images carried by paper sheets, cards or other suitable supports, as well as colour reproductions from diapositives. In this second case, the photocopying machine 1 can be utilized as described later.

The movable mirror 31 is controlled by the push buttom 4 to be positioned in the one of the two above mentioned positions.

If the movable mirror 31 is disposed in the position indicated by a dashed line in the drawing, namely out of the conventional projection light beam, the photocopying machine 1 is qualified for operating in a conventional manner and thus colour photocopies from images disposed onto the shooting plane 11 thereof can be obtained.

On the contrary, if said movable mirror 31 is positioned as illustrated by a continuous line in the drawing, namely it is disposed within the conventional projection light beam, so as to reflect the image produced by the stereopticon lantern 2 onto the same screen 15 where during the conventional operation of the machine the image were projected, the operation of the conventional reproduction part is automatically shut out and the sole part which effects reproductions from diapositives is qualified for operating.

Obviously, adequate control and operating devices are provided for permitting such movable mirror 31 and in case of other elements such as the optical control unit 29, if provided for obtaining continuous regulations of the enlargement ratios of the image obtained from diapositives, to be accurately positioned, as well as for operating and controlling the chromatic correction coloured filters. Finally, it is to point out that the two parts devoted to the reproduction from dispositives, namely said fixed part constituted by said movable mirror 31 together with the relative means for connecting it to the structure of the photocopying machine 1 and the control means thereof, as well as the removable part constituted by the head 20 of the stereopticon lantern 2, can be assembled advantageously together to form a sole unit which may be fitted to or removed from the conventional photocopying machine, in the same manner in which the sole removable part is fitted to or removed from the machine described in the embodiment referred to.

From what it has been described, it appears evident the considerable advantage attainable by utilizing the device reffered to.

In fact, according to the proposed solution, by utilizing a conventional colour photocopying machine only with slight modifications for prearranging it for the application of such device thereto, it is possible to obtain, besides the conventional colour photoreproduction also the photoreproduction from diapositives, by providing also the possibility of regulating the enlargement ratio at will.

It is well understood that different variants may be brought to the invention referred to, hower without departing from the sphere of what it has been described and hereinafter claimed with reference to the attached drawing, and therefore from the protection field of the present industrial invention.

I claim:

1. A color photocopying machine comprising:
   an upper horizontally extending shooting surface for supporting medium having an image to be reproduced;
   lamp means disposed below said shooting surface for illuminating media supported on said shooting surface;
   mirror means disposed below said shooting surface and inclined thereto for reflecting images on media supported on said shooting surface along a projection axis in the machine;
   photosensitive paper support means for supporting photosensitive paper as a planar screen in a projection position in the machine;
   an optical control unit disposed in the path of the projection axis between said mirror means and the projection position at which said photosensitive paper support means supports photosensitive paper in the machine for focusing images reflected by said mirror means onto photosensitive paper supported by said photosensitive paper support means in the projection position;

developing means for developing photosensitive paper which has been exposed to images in the machine;

a stereopticon lantern removably mountable in the machine laterally of said shooting surface, said stereopticon lantern including an enclosure, a lamp supported in said enclosure, reflector means disposed in said enclosure in association with said lamp for reflecting light from the lamp in a diapositive illuminating direction, and diapositive support means disposed in said enclosure and adapted to support diapositives in the path of light reflected in the diapositive illuminating direction by said reflector means;

a movable mirror movable in the machine, with said stereopticon lantern mounted in the machine, between a first position at which said movable mirror reflects light from said lamp that has been reflected by said reflector means through diapositives supported by said diapositive support means onto photosensitive paper supported in said projection position by said photosensitive paper support means, and a second position which allows said optical control unit to focus images reflected by said mirror means onto photosensitive paper supported in said projection position by said photosensitive paper support means.

2. A color photocopying machine as claimed in claim 1, wherein said machine has framework disposed laterally of said planar shooting surface and through which framework an opening extends, said enclosure includes a peripheral flange, and said framework has a frame portion surrounding said opening and complimentary to said peripheral flange, said peripheral flange being seatable in said frame portion to removably mount said stereopticon lantern in the machine, and said opening thereby being closeable by a cover when said stereopticon lantern is not mounted in the machine.

3. A color photocopying machine as claimed in claim 2, and further comprising a pair of parallel spaced-apart support plates extending vertically downward in the machine from the framework thereof with said stereopticon lantern mounted in the machine, a pivot axis extending between said plates, and wherein said mirror is pivotably mounted to said plates about said pivot axis so as to be pivotable between said first and said second positions thereof.

4. A color photocopying machine as claimed in claim 2, and further comprising a second optical control unit disposed in the machine in the path of light reflected by said reflector means for focusing images of diapositives supported by said diapositive support means onto photosensitive paper supported at said projection position by said photosensitive paper support means.

5. A color photocopying machine as claimed in claim 3, and further comprising a second optical control unit disposed in the machine in the path of light reflected by said reflector means for focusing images of diapositives supported by said diapositive support means onto photosensitive paper supported at said projection position by said photosensitive paper support means.

6. A color photocopying machine as claimed in claim 4, wherein said stereopticon lantern, said movable mirror, and said second optical control unit together constitute a single unit removably mountable in the machine.

7. A color photocopying machine as claimed in claim 5, wherein said stereopticon lantern, said parallel spaced-apart support plates, said movable mirror and said second optical control unit together constitute a single unit removably mountable in the machine.

8. A color photocopying machine as claimed in claim 1, wherein said mirror means is a mirror for reflecting images on media supported on said shooting surface along a projection axis extending orthogonally to the direction along which said mirror means is positioned relative to said shooting plane, and said photosensitive paper support means supports photosensitive paper in the machine in a projection position in which the photosensitive paper extends vertically.

9. A color photocopying machine as claimed in claim 1, wherein said photosensitive paper support means includes a roller for supporting a roll of photosensitive paper, means for supporting a portion of the roll of photosensitive paper in said projection position, and cutting means for cutting the roll into sheets.

10. A color photocopying machine as claimed in claim 1, wherein said developing means includes a developing unit in which photosensitive paper exposed to images in the machine is developed, a drying unit disposed adjacent said developing unit for drying photosensitive paper, and means for progressively feeding photosensitive paper through said developing unit and then through said drying unit.

11. A color photocopying machine as claimed in claim 1, wherein said diapositive support means includes a holder frame adapted to directly support diapositives, and a loading slide slidably mounted to said enclosure and to which loading slide said holder frame is mounted, said loading slide being slidable between a loading position at which diapositives are mountable to said holder frame and a loaded position at which a diapositive mounted to said holder frame is disposed within said enclosure.

12. A color photocopying machine as claimed in claim 1, wherein the first position of said movable mirror is one at which said movable mirror is also disposed between photosensitive paper supported by said photosensitive paper support means at said projection position and said mirror means thereby preventing images on media supported on said shooting surface from being focused on the photosensitive paper by said optical control unit.

13. A stereopticon lantern device for use with a color photocopying machine to enable said photocopying machine to make reproductions from diapositives, said device comprising an enclosure, a lamp supported in said enclosure, reflector means disposed in said enclosure in association with said lamp for reflecting light from the lamp in a diapositive illuminating direction, diapositive support means disposed in said enclosure and adapted to support a diapositive in the path of light reflected in the diapositive illuminating direction by said reflector means, and a mirror connected to said enclosure and movable thereto between first and second positions.

14. A stereopticon lantern as claimed in claim 13, wherein said enclosure, said reflector means, said diapositive support means and said mirror are an integral unit.

15. A stereopticon lantern as claimed in claim 13, and further comprising a pair of parallel spaced-apart support plates between which a pivot axis extends, said mirror being pivotably mounted to said plates about said pivot axis so as to be pivotable between said first and second positions thereof.

16. A stereopticon lantern as claimed in claim 13, and further comprising an optical control unit disposed between said diapositive support means and said mirror for focusing images of diapositives supported by said diapositive support means on said mirror.

* * * * *